United States Patent
Cheng et al.

(10) Patent No.: US 8,923,148 B2
(45) Date of Patent: *Dec. 30, 2014

(54) EFFICIENT UPLINK TRANSMISSION OF CHANNEL STATE INFORMATION

(75) Inventors: Jung-Fu Cheng, Fremont, CA (US); Kambiz Zangi, Chapel Hill, NC (US); Dennis Hui, Cary, NC (US); Leonid Krasny, Cary, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 194 days.

This patent is subject to a terminal disclaimer.

(21) Appl. No.: 13/439,759

(22) Filed: Apr. 4, 2012

(65) Prior Publication Data

US 2012/0188972 A1    Jul. 26, 2012

Related U.S. Application Data

(63) Continuation of application No. 12/555,966, filed on Sep. 9, 2009, now Pat. No. 8,208,397.

(60) Provisional application No. 61/172,484, filed on Apr. 24, 2009.

(51) Int. Cl.
| | |
|---|---|
| H04L 12/26 | (2006.01) |
| H04B 7/02 | (2006.01) |
| H04L 1/20 | (2006.01) |
| H04B 17/00 | (2006.01) |
| H04L 25/02 | (2006.01) |
| H04L 1/00 | (2006.01) |
| H04B 7/06 | (2006.01) |

(52) U.S. Cl.
CPC ............ *H04B 17/0047* (2013.01); *H04B 7/024* (2013.01); *H04L 25/0224* (2013.01); *H04L 1/20* (2013.01); *H04L 1/0009* (2013.01); *H04L 1/0019* (2013.01); *H04B 7/0639* (2013.01); *H04L 1/0026* (2013.01); *H04L 25/022* (2013.01); *H04B 17/006* (2013.01); *H04L 25/0212* (2013.01); *H04B 7/0626* (2013.01); *H04L 1/0003* (2013.01)

USPC .......................... 370/252; 370/482; 370/491

(58) Field of Classification Search
CPC ... H04W 24/00; H04L 43/50; H04L 43/0852; H04L 43/00; H04L 5/0048; H04B 17/003; H04B 17/00
USPC ......... 370/241, 252, 310, 328, 336, 464, 480, 370/482, 491; 714/699, 746, 752
See application file for complete search history.

(56) References Cited

U.S. PATENT DOCUMENTS

| | | | |
|---|---|---|---|
| 7,675,894 B2 * | 3/2010 | Wunder et al. | 370/343 |
| 8,208,397 B2 * | 6/2012 | Cheng et al. | 370/252 |

(Continued)

FOREIGN PATENT DOCUMENTS

| | | |
|---|---|---|
| EP | 1 786 133 A1 | 5/2007 |
| JP | 2004-266814 A | 9/2004 |

(Continued)

OTHER PUBLICATIONS

Abe K. et al., "A study on Reduction of the Amount of CSI Feedback in MIMO-OFDM Eigenbeam-Space Division Multiplexing Systems", The Institute of Electronics, Information and Communication Engineers Technical Report, Feb. 27, 2008, vol. 107, No. 518, pp. 293-298.

(Continued)

*Primary Examiner* — Chi H Pham
*Assistant Examiner* — Weibin Huang

(57) ABSTRACT

A UE in a wireless communication network transmits succinct, direct channel state information to the network, enabling coordinated multipoint calculations such as joint processing, without substantially increasing uplink overhead. The UE receives and processes reference symbols over a set of non-uniformly spaced sub-carriers, selected according to a scheme synchronized to the network. The frequency response for each selected sub-carrier is estimated conventionally, and the results quantized and transmitted to the network on an uplink control channel. The non-uniform sub-carrier selection may be synchronized to the network in a variety of ways.

89 Claims, 4 Drawing Sheets

(56) References Cited

U.S. PATENT DOCUMENTS

| | | | |
|---|---|---|---|
| 2004/0218519 A1* | 11/2004 | Chiou et al. | 370/203 |
| 2005/0232156 A1* | 10/2005 | Kim et al. | 370/236 |
| 2008/0187061 A1* | 8/2008 | Pande et al. | 375/260 |
| 2009/0016425 A1* | 1/2009 | Hui et al. | 375/240 |
| 2010/0272074 A1 | 10/2010 | Cheng et al. | |

FOREIGN PATENT DOCUMENTS

| | | |
|---|---|---|
| JP | 2007-143143 A | 6/2007 |
| WO | WO 2008/052479 A2 | 5/2008 |

OTHER PUBLICATIONS

Motoyoshi K. et al., "A study on CSI Feedback Bandwidth Reduction Method for FDD-based OFDM Systems", The Institute of Electronics, Information and Communication Engineers, communication society meeting papers 1, Sep. 7, 2005, p. 428, B-5-28.

Duel-Hallen A. et al., "Long Range Prediction and Reduced Feedback for Mobile Radio Adaptive OFDM Systems", Wireless Communications, IEEE Transactions, Oct. 2006, pp. 2723-2733.

Wong I. et al., "Joint Channel Estimation and Prediction for OFDM Systems", Global Telecommunications Conference, GLOBECOM '05, IEEE, Dec. 2, 2005, vol. 4, pp. 22552259.

Kayama H. et al., "A Study on the Accurate Channel Estimation Method Applying Sinc Function Based Channel Replica for a Broadband OFDM Wireless Communication System", The Institute of Electronics, Information and Communication Engineers Technical Report, Aug. 16, 2007, Vol.1 07, No. 192, pp. 99-104, RCS2007-70.

Li Y. et al., "A Novel Scheme for Channel State Information Feedback in MIMO-OFDMA System", Circuits and Systems for Communications, 2008 ICCSC 2008. 4th IEEE International Conference, May 28, 2008, pp. 205-209.

3GPP TS 36.213, v8.5.0 (Dec. 2008), 3rd Generation Partnership Project; Technical Specification Group Radio Access Network; Evolved Universal Terrestrial Radio Access; Physical layer procedures (Release 8), Section 7.2.1.

* cited by examiner

EFFICIENT UPLINK TRANSMISSION OF CHANNEL STATE INFORMATION

CROSS-REFERENCE TO RELATED APPLICATIONS

This application claims priority to U.S. Provisional Patent Application Ser. No. 61/172,484, filed Apr. 24, 2009, titled "Channel State Information Feedback by Digital Loopback," and is a Continuation of U.S. Regular application Ser. No. 12/555,966 filed Sep. 9, 2009 now U.S. Pat. No. 8,208,397, their entire contents are respectively incorporated herein by reference.

TECHNICAL FIELD

The present invention relates generally to wireless communication systems, and in particular, the present invention relates to an efficient system and method of providing channel state information from user equipment to a wireless communication network.

BACKGROUND

Wireless communication networks transmit communication signals in the downlink over radio frequency channels from fixed transceivers, known as base stations, to mobile user equipment (UE) within a geographic area, or cell. The UE transmit signals in the uplink to one or more base stations. In both cases, the received signal may be characterized as the transmitted signal, altered by channel effects, plus noise and interference. To recover the transmitted signal from a received signal, a receiver thus requires both an estimate of the channel, and an estimate of the noise/interference. The characterization of a channel is known as channel state information (CSI). One known way to estimate a channel is to periodically transmit known reference symbols, also known as pilot symbols. Since the reference symbols are known by the receiver, any deviation in the received symbols from the reference symbols (once estimated noise/interference is removed) is caused by channel effects. An accurate estimate of CSI allows a receiver to more accurately recover transmitted signals from received signals. In addition, by transmitting CSI from the receiver to a transmitter, the transmitter may select the transmission characteristics—such as coding, modulation, and the like—best suited for the current channel state. This is known as channel-dependent link adaptation.

Modern wireless communication networks are interference limited. The networks typically process transmissions directed to each UE in a cell independently. Transmissions to other UEs in the same cell are regarded as interference at a given UE—giving rise to the term inter-cell interference. One approach to mitigating inter-cell interference is Coordinated Multipoint (CoMP) transmission. CoMP systems employ numerous techniques to mitigate inter-cell interference, including MIMO channels, numerous distributed antennas, beamforming, and Joint Processing.

Joint Processing (JP) is a CoMP transmission technique currently being studied for Long Term Evolution (LTE) Advanced. In JP, transmissions to multiple UEs are considered jointly, and a global optimization algorithm is applied to minimize inter-cell interference. That is, JP algorithms attempt to direct transmission energy toward targeted UEs, while avoiding the generation of interference at other UEs. To operate effectively, JP systems require information about the transmission channels. There are two ways in which the channel information, or CSI, is fed back to system transmitters: Precoding Matrix Indicator (PMI) and quantized channel feedback.

PMI feedback, specified in LTE Release 8, is essentially a recommendation of a transmission format by each UE. A plurality of pre-defined precoding matrices are designed offline and known at both the base station and UE. The precoding matrices define various sets of downlink coding and transmission parameters. Each UE measures its channel, and searches through the precoding matrices, selecting one that optimizes some quantifiable metric. The selected precoding matrix is fed back or reported to the base station. The base station then considers all recommended precoding matrices, and selects the precoding and transmission parameters that implement a globally optimal solution over the cell. In the scenarios contemplated when Release-8 LTE was designed, PMI feedback works well, due to a high correlation between recommendations from UEs and the actual desirable transmission parameters. PMI feedback compression reduces uplink bandwidth by exploiting the fact that only part of the channel—the "strong directions," i.e., the signal space—needs to be fed back to the transmitter.

In JP CoMP applications, it is unlikely that the desired transmission format (which achieves interference suppression) will coincide with a transmission format recommended by a UE. No recommending UE has any knowledge about other UEs that will be interfered by the transmission to the recommending UE. Additionally, the recommending UE has no knowledge of transmissions scheduled to other UEs that will interfere with its signals. Also, PMI feedback compression reduces bandwidth by reporting only the part of the channel of interest to transmissions directed to the recommending UE. While this increases uplink efficiency for non-cooperative transmission, it is disadvantageous for cooperative transmission, as it denies the network information about the channel that may be useful in the JP optimization.

In quantized channel feedback, UEs attempt to describe the actual channel. In contrast to PMI feedback, this entails feeding back information about not only the signal space but also the complementary space (the "weaker space," also somewhat inaccurately referred to as the "null space") of the channel. Feedback of the whole channel results in several advantages. With full CSI available at the network, coherent JP schemes can suppress interference. Additionally, the network can obtain individualized channel feedback by transmitting unique reference symbols to each UE. This enables flexible and future-proof implementations of a variety of JP transmission methods, since the methods are essentially transparent to the UE.

Even without JP CoMP transmission, CSI at the network can solve one of the most fundamental problems plaguing current wireless system—the inaccuracy in channel-dependent link adaptation due to the network not being able to predict the interference experienced by the UEs (a problem closely related to the well-known flash-light effect). Once the network knows the CSI of bases near each UE, the network can accurately predict the SINR at each UE resulting in significantly more accurate link adaptation.

Even though the advantages of direct CSI over PMI feedback are clear, the major issue with direct CSI feedback is bandwidth. Full CSI feedback requires a high bitrate to transmit the CSI from each UE to the network. Time-frequency uplink channel resources must be used to carry the CSI feedback on the uplink channel, making these resources unavailable for transmitting user data on the uplink—the CSI feedback transmissions are thus pure overhead, directly reducing the efficiency of uplink data transmissions. Conveying direct CSI feedback to the network without consuming excessive uplink resources stands as a major challenge of modern communication system design.

SUMMARY

According to one or more embodiments described and claimed herein, a UE in a wireless communication network transmits succinct, direct channel state information to the network, enabling coordinated multipoint calculations such as joint processing, without substantially increasing uplink overhead. The UE receives and processes reference symbols over a set of non-uniformly spaced sub-carriers, selected according to a scheme synchronized to the network. The frequency response for each selected sub-carrier is estimated conventionally, and the results quantized and transmitted to the network on an uplink control channel. The non-uniform sub-carrier selection may be synchronized to the network in a variety of ways.

One embodiment relates to a method of reporting channel state information by a UE operative in a wireless communication network in which downlink data is modulated onto a plurality of sub-carriers, each having a different frequency. A plurality of known reference symbols are received over a subset of the plurality of sub-carriers. A set of non-uniformly spaced sub-carriers is selected using a selection scheme synchronized to the network. A frequency response is estimated for each selected sub-carrier. The frequency responses are quantized and transmitted to the network via an uplink control channel.

DETAILED DESCRIPTION

For the purpose of clear disclosure and full enablement, the present invention is described herein as embodied in a wireless communication network based on Orthogonal Frequency Division Multiplex (OFDM) modulation. More specifically, embodiments herein are based on the Evolved Universal Terrestrial Radio Access (E-UTRA) system, which is also commonly referred to as the Long-Term Evolution (LTE) of the widely deployed WCDMA systems. Those of skill in the art will readily appreciate that these systems are representative only and not limiting, and will be able to apply the principles and techniques of the present invention to a wide variety of wireless communication systems, based different access and modulation methods, given the teachings of the present disclosure.

Figure 1:
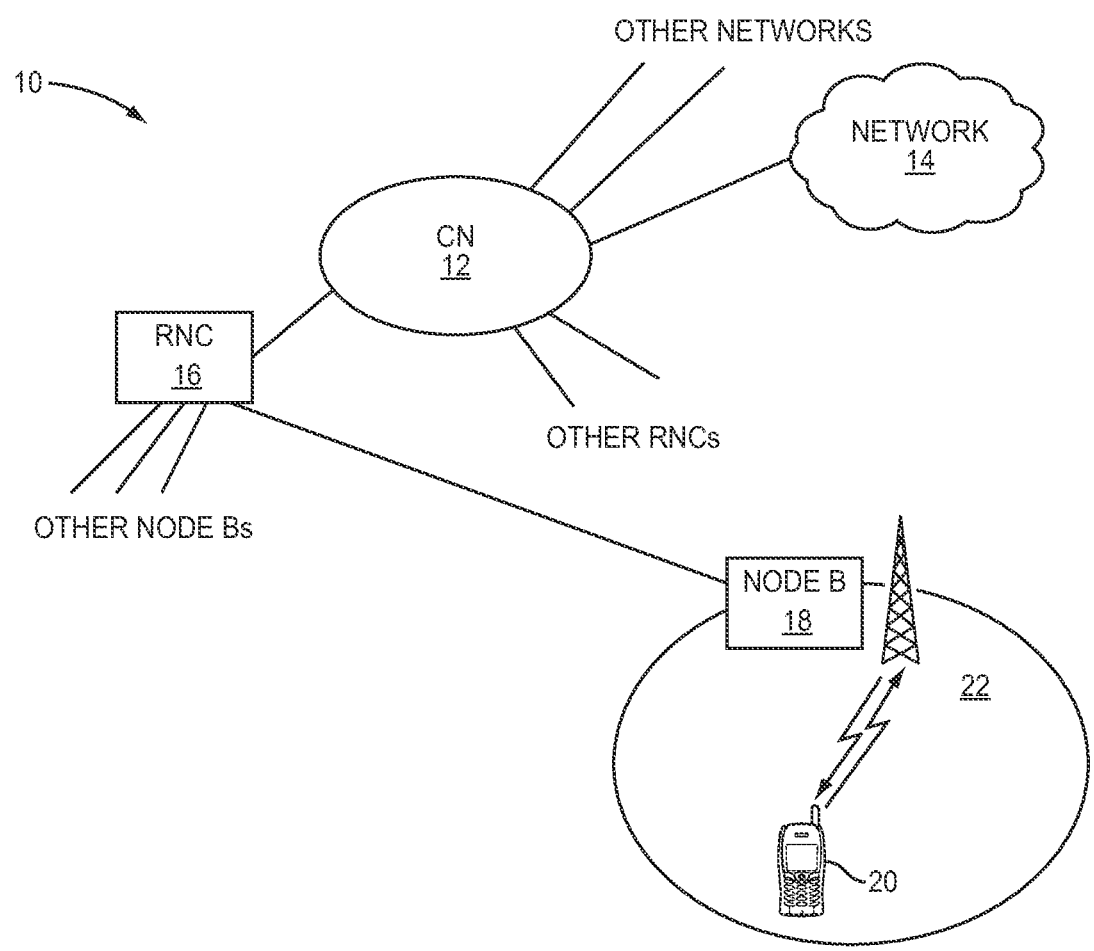
FIG. 1 is a functional block diagram of a wireless communication network.

FIG. 1 depicts a wireless communication network 10. The network 10 includes a Core Network (CN) 12, communicatively connected to one or more other networks 14, such as the Public Switched Telephone Network (PSTN), the Internet, or the like. Communicatively connected to the CN 12 are one or more Radio Network Controllers (RNC) 16, which in turn control one or more Node B stations 18. The Node B 18, also known as a base station, includes radio frequency (RF) equipment and antennas necessary to effect wireless radio communications with one or more user equipment (UE) 20 within a geographic region, or cell 22. As depicted, the Node B 18 transmits data and control signals to the UE 20 on one or more downlink channels, and the UE similarly transmits data and control signals to the Node B 18 on the uplink.

Figures 2A, 2B, 2C:
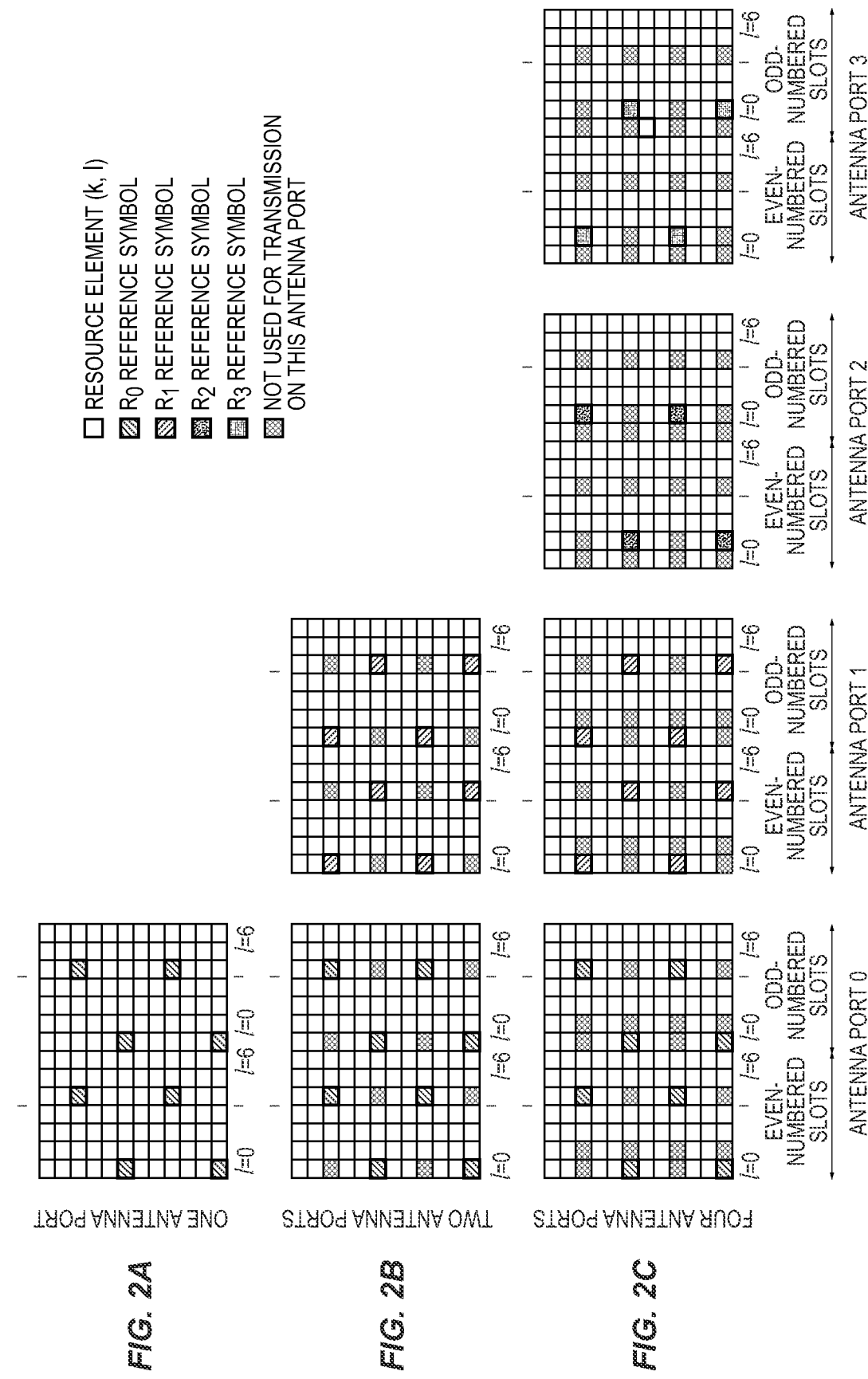
FIG. 2A is a time-frequency plot showing reference symbol transmission from a single antenna port.
FIG. 2B is a time-frequency plot showing reference symbol transmission from two antenna ports.
FIG. 2C is a time-frequency plot showing reference symbol transmission from three antenna ports.

Interspersed within the data on the downlink transmission, the network 10 transmits reference symbols, also known in the art as pilot symbols, to assist the UEs 20 performing channel estimation on the downlink channel responses. FIG. 2A depicts example of the reference symbol resources for the LTE network 10 of FIG. 1, when the Node B 18 transmits on a single antenna port. The depicted grid plots sub-carriers on the ordinate axis (frequency increasing downwardly) and time (increasing to the right) on the abscissa axis. Note that the time periods are organized into frames, with even-numbered and odd-numbered slots depicted. Each grid element is an OFDM time-frequency resource element, which may carry a data symbol, reference symbol, or neither. FIGS. 2B and 2C depict reference symbol transmissions when the Node B 18 transmits on two and four antenna ports, respectively.

The reference symbols enable the UE to employ a wide range of standard techniques to estimate the frequency responses of all sub-carriers. Since the values of the reference symbols are known to the UE 20, the estimation quality is generally highest on the sub-carriers occupied by the reference symbols.

Figure 3:
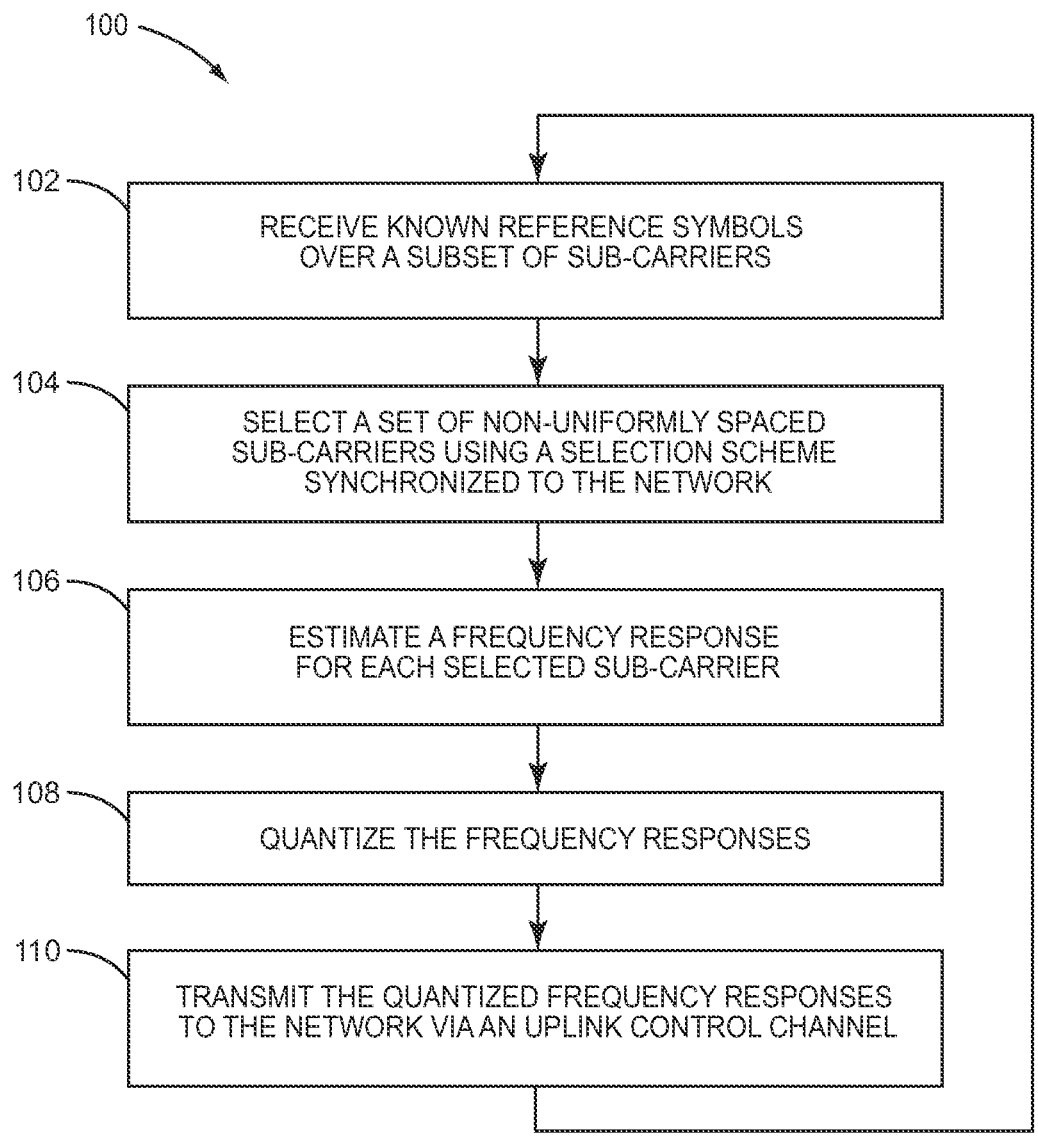
FIG. 3 is a flow diagram of a method of reporting CSI feedback by a UE.

FIG. 3 depicts a method of reporting CSI by a UE 20 to the network 10, according to one embodiment. The UE 20 receives known reference symbols over some of the sub-carriers transmitted to it, as depicted in FIG. 2 (block 102). The UE 20 selects a set of non-uniformly spaced sub-carriers, on which to perform channel estimation for CSI feedback (block 104). In one embodiment, selection of sub-carriers is limited to those on which reference symbols are transmitted, because the channel estimation quality is generally highest at these sub-carriers. However, in other embodiments, the UE 20 additionally selects one or more sub-carriers that do not include reference symbols. As discussed further herein, the selection of non-uniformly spaced sub-carriers is performed according to a scheme that is synchronized in some manner with the network. The UE 20 estimates the frequency response of the channel (block 106). The frequency response samples associated with the selected sub-carriers are then quantized or encoded by a suitable source encoder into digital bits (block 108). The digital bits are then transmitted via a suitable control channel from the UE 20 to the network 10 (block 110). The control channel provides suitable error detection and correction coding as well as radio resources (transmission power and frequency resource allocation) to ensure proper reception quality at the network 10. The method then repeats.

Figure 4A:
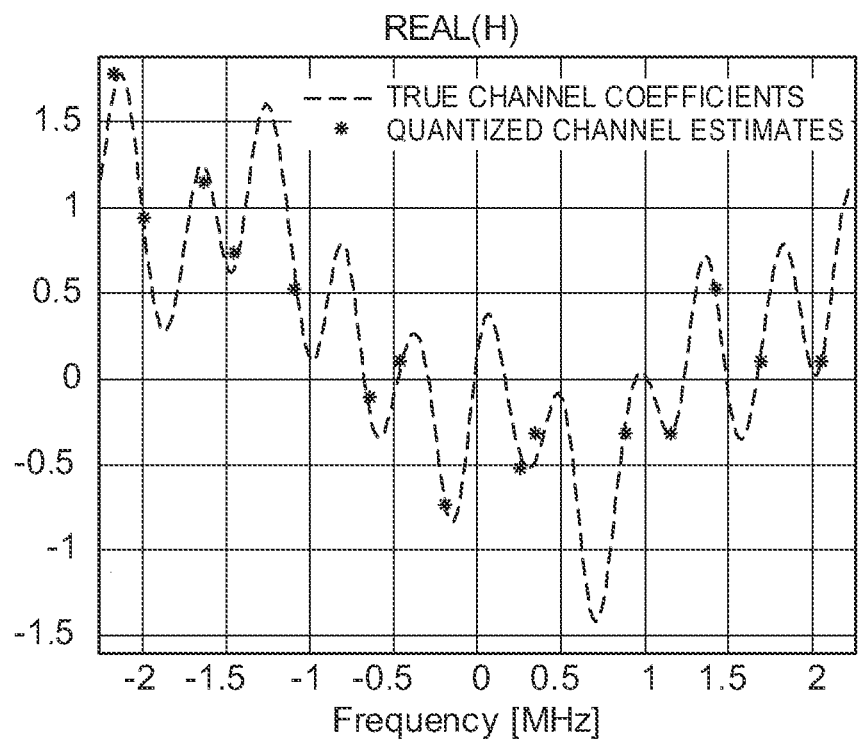
FIG. 4A is a graph of the in-phase component of a representative channel response, depicting the quantized channel estimates reported to the network.
Figure 4B:
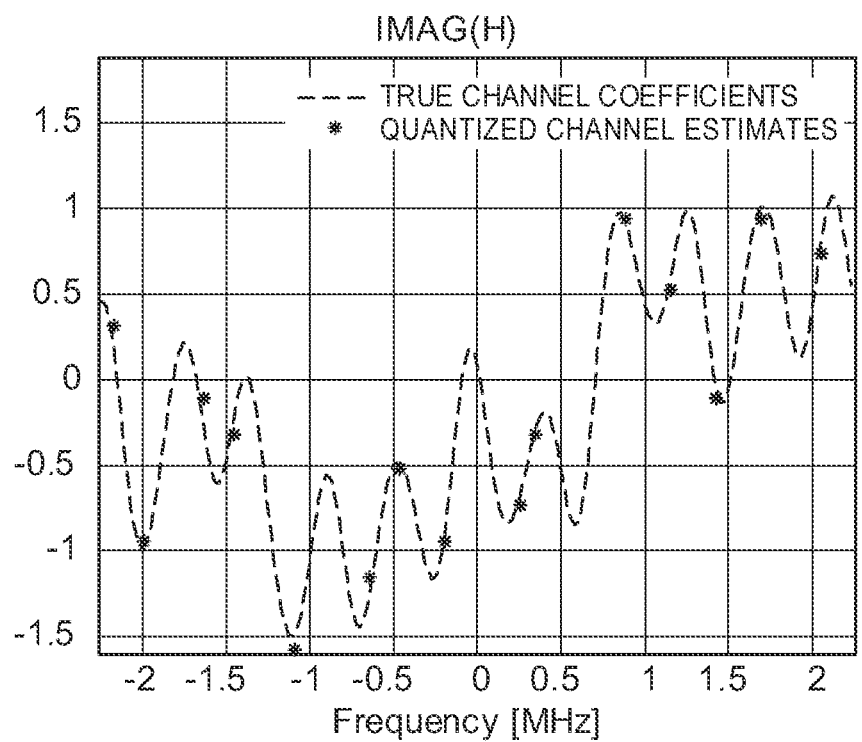
FIG. 4B is a graph of the quadrature component of a representative channel response, depicting the quantized channel estimates reported to the network.

FIGS. 4A and 4B depict the representative channel frequency response for in-phase (FIG. 4A) and quadrature (FIG. 4B) components of a received signal. Out of 50 reference symbol sub-carriers tones over a 5 MHz band, a subset of 15 non-uniformly spaced reference symbol sub-carriers is selected. These samples are depicted as stars in FIGS. 4A and 4B. The samples do not always lie on the frequency response curves due primarily to two sources of noise. First, it is assumed the mean square error (MSE) of the UE channel estimator at the reference symbol sub-carriers is ~20 dB. Secondly, the I and Q parts of the selected channel estimates are digitized independently by a simple 4-bit uniform quantizer. The resulting average quantization noise is about ~22 dB. With this setup, a total of 15*4*2=120 bits are fed back by the UE 20.

With uniform sampling, the Nyquist theorem dictates that samples (sub-carriers) must be selected at twice the highest frequency of the channel frequency response curve, to fully characterize the curve. Using non-uniform samples, however, far fewer than the Nyquist criterion of sub-carriers may be selected, with a high probability of accurate reconstruction of the channel frequency response curve by the network 10. Accordingly, by selecting non-uniformly spaced sub-carriers, the UE 20 may fully characterize the channel and provide direct CSI feedback, without imposing excessive overhead on the uplink channel.

Upon receipt by the network 10, the received CSI feedback bits are demodulated and inverse quantized. The complete frequency domain channel coefficients may be estimated by setting a time-domain tap-delay channel model based on the received sub-carrier samples. Applying, e.g., a Fast Fourier Transform (FFT) to the estimated delay coefficients yields a frequency-domain response very close to that depicted in FIGS. 4A and 4B. Detail of the network-side processing of CSI feedback based on channel estimates of non-uniformly spaced sub-carriers is disclosed in copending U.S. patent application Ser. No. 12/555,973, assigned to the assignee of the present application, filed concurrently herewith, and incorporated herein by reference in its entirety. The network-side processing assumes the network 10 is aware of which non-uniformly selected sub-carriers were analyzed by the UE 20. Thus, the UE 20 must select the non-uniformly spaced sub-carriers according to a scheme, protocol, or formula that is synchronized with the network 10. There are numerous ways to accomplish this.

In one embodiment, the set of non-uniformly spaced sub-carriers is changed for each batch, or iteration, of CSI feedback reporting, in a manner coordinated with the network 10.

In one embodiment, the set of non-uniformly spaced sub-carriers is selected based on pseudo-randomized indices with synchronized reading offset. For example, the pseudo-randomized indices may be obtained by taking sequentially the indices produced by a pseudo-random number generator. The pseudo-random number generator may be computed based on an algebraic modification of the input reading indices. For example, the algebraic modification may be based quadratic permutation polynomials (QPP), as described in the 3GPP Technical Specifications 36.212, "Multiplexing and channel coding," incorporated herein by reference. As another example, the algebraic modification may be based on a finite-field computation.

As another example of pseudo-randomized indices with synchronized reading offset, the pseudo-randomized indices may be obtained by taking sequentially the indices produced by an interleaver. The interleaver may be computed based on a column-interleaved rectangular array, as described in section 5.1.4.2.1 of the 3GPP Technical Specifications 36.212.

As yet another example, the sequential reading of indices may be synchronized between UE 20 and the network 10 via an agreed index reading offset. The agreed index reading offset may be obtained in many ways. It may be transmitted explicitly in the same transport channel with the digital bits from the UE 20 to the network 10. Alternatively, the agreed index reading offset may be implicitly computed based on a UE 20 identification number, a sub-frame number, a CSI feedback batch or iteration count, an antenna identification number, a network-side identification number, or the uplink control channel recourse index (e.g., where it is the index of the first resource block for the uplink control channel). The agreed index reading offset may be implicitly computed based on the downlink control channel resource index (e.g., where it is the index of the first resource block for the downlink control channel). Alternatively, the agreed index reading offset may be transmitted from the network 10 to the UE 20 prior to the UE 20 performing channel estimation, or may be pre-agreed between the network 10 and the UE 20. In either case, the index reading offsets may be stored in the UE 20 as a loop-up table.

In one example, the set of non-uniformly spaced sub-carriers is selected by initially selecting uniformly spaced sub-carriers, and then applying pseudo-randomized dithering, with a key synchronized to the network 10, to the uniformly spaced sub-carriers to generate the set of non-uniformly spaced sub-carriers. In one embodiment, the maximum span of the pseudo-randomized dithering is selected to be smaller than the uniform spacing in the uniformly spaced indices. The generation of pseudo-randomized dithering may be computed based on algebraic modification of an input key. As described above with respect to the non-uniform sub-carrier selection, the pseudo-randomized dithering may be obtained by taking sequentially the indices produced by an interleaver or a pseudo-random number generator, with the generation of indices computed by the UE 20 based on any of the factors above, or communicated between the network 10 and UE 20, as also described above.

A more general formulation of the selection of sub-carriers, channel estimation, and quantization and reporting of CSI feedback is now presented. The frequency response of a channel at frequency f and time t can be expressed in terms of the time domain channel taps h(l; t) having delays $\tau_l$ as follows:

$$H(f;t) = \sum_{l=0}^{L-1} h(l;t) e^{-j2\pi f \tau_l}$$

At each reporting iteration or time t, the following steps are performed by the UE 20:

First, the UE 20 forms an estimate of the downlink channel at a number of sub-carriers. As described above, known reference signals are transmitted from each network antenna (see FIG. 2A-2C), and the UE 20 can use these reference signals to form an estimate of the channel at a number of sub-carriers using standard techniques. These estimates are denoted by the following N×1 vector:

$$g(t) = [\hat{H}(f_1;t) \hat{H}(f_2;t) \Lambda \hat{H}(f_N;t)]^T$$

Where $\hat{H}(f;t)$ is the UE-estimated frequency response of the channel at frequency f and time t.

Second, for each reporting instant, the UE 20 forms a number of linear combinations of elements of g(t), i.e., the UE 20 multiplies the vector g(t) by a mixing matrix P(t), of size M×N, to get a new vector r(t) of size M×1, according to:

$$r(t) = P(t) \times g(t).$$

In embodiments where the elements of P(t) comprise only the values zero or one, P(t) "selects" elements from the vector of channel estimates of non-uniform sub-carriers g(t) according to each row of P(t). In some embodiments, the results of computations or communications described above to select the reading offsets of pseudo-randomized indices may be stored in the mixing matrix P(t). In more general embodiments, however, the elements of P(t) are not restricted to the values zero or one. For example, the elements may comprise fractional values between zero and one, in which case they act as weighting factors as well as selectors. Additionally, the elements may comprise complex values.

The mixing matrix P(t) may be changed for different sets of iterations of CSI feedback. In one embodiment, the selection of P(t) may be by a round-robin selection from among a collection of mixing matrices. In one embodiment, the changing of P(t) may comprise selecting different row compositions. For example, the selection of different row compositions may be based on the round-robin use of a plurality of rows. As another example, it may be based on a pseudo-randomized selection from a plurality of rows. The pseudo-randomized selection of rows may be obtained by taking sequentially the indices produced by an interleaver or pseudo-random number generator, where the indices may be communicated or computed in any manner described above.

In one embodiment, the mixing matrix P(t) comprises rows having at most one non-zero element. In another embodiment, the mixing matrix P(t) comprises rows given by an orthonormal matrix, such as a Hadamard matrix. In yet another embodiment, the mixing matrix P(t) comprises rows given by a unitary matrix. In still another embodiment, the mixing matrix P(t) may be generated by first generating pseudo-random matrices $\{A_i\}$ with independent Gaussian-distributed entries, performing a QR decomposition on each $A_i$, and using each resulting unitary Q matrix as a candidate for P(t).

However the mixing matrix P(t) is derived, after the multiplication with g(t), the elements of the product matrix r(t) are quantized using a quantizer $Q_r(\cdot)$ to obtain a number of bits, denoted as the vector b(t), representing the vector r(t). The bits in b(t) are then transmitted to the network 10 using an uplink control channel. As known in the art, the transmission process may include adding redundancy such as CRC, FEC, and the like, to ensure reliable transmission to the network 10.

In the embodiments described above, the UE 20 determines the parameters for selecting non-sequential sub-carriers and/or the dithering parameters to generate a non-sequential selection of sub-carriers, such as the selection of indices for a pseudo-random number generator, autonomously or quasi-autonomously from the network 10 (although, of course, whatever selection mechanism is employed must be synchronized with the network 10). In some embodiments, however, the network 10 directly controls these and other parameters via transmissions to the UE 20 in the downlink.

In one embodiment, the network 10 determines the set of sub-carriers $(f_1, \ldots, f_N)$, for which the UE 20 should estimate channel response and place in vector g(t). In one embodiment, the network 10 determines the mixing matrix P(t) that the UE 20 should use at each reporting instance. In one embodiment, the network 10 determines the quantizer $Q_r(\cdot)$ that the UE 20 uses at each reporting instance, which determines, for example, how many bits are used to quantize each element of r(t). In one embodiment, the network 10 determines how often the CSI feedback reports should be transmitted by the UE 20 on the uplink. In all these embodiments, the network 10 communicates the relevant determinations to the UE 20 in downlink communications. Additionally, of course, the network 10 schedules the time-frequency uplink resources on which the CSI feedback reports shall be transmitted by the UE 20, just as for any uplink communications.

In a typical network 10, each UE 20 might have to report CSI feedback on multiple downlink channels, from multiple different Node Bs 18. Since the path loss between each UE 20 and Node B 18 is different, the downlink channels to be estimated and reported by each UE 20 will have different average power. With a fixed bitrate budget for CSI feedback allocated to each UE 20, a problem arises as how this total fixed bitrate should be divided among the different downlink channels seen by the UE 20.

If a channel between a given UE 20 and a given Node B 18 is extremely weak, the signals transmitted from the Node B 18 will have very little impact at the receiver of the UE 20. Hence, there is little need for the UE 20 to report CSI feedback corresponding to the channels that are very weakly received at the UE 20. Accordingly, in one embodiment, the UE 20 allocates a larger portion of its allocated CSI feedback bitrate to the downlink channels that are relatively strong, than to the channels that are relatively week. Given a set of average channel signal strengths g(1), g(2), . . . , g(B), and a total CSI feedback allocation of K bits, the network 10 can allocate its total bitrate budget among the various channels. In one embodiment, the network 10 performs the allocation according to a Generalized Breiman, Friedman, Olshen, and Stone (BFOS) Algorithm, as described by E. A. Riskin in the paper, "Optimal Bit Allocation via Generalized BFOS Algorithm," published in the IEEE Trans. Info. Theory, 1991, the disclosure of which is incorporated herein by reference in its entirety.

In one embodiment, the reporting of CSI feedback may be spread out over a plurality of iterations of CSI feedback. That is, a set of non-uniformly spaced subcarriers are selected, and a frequency response is calculated for each subcarrier. The frequency responses are quantized. However, rather than transmit all of the quantized frequency response data to the network at once, the reporting is spread over two or more iterations of CSI feedback. For example, at time N, some number, e.g. ten, subcarriers are selected, and their frequency responses calculated and quantized (possibly jointly). The quantized bits may then be transmitted to the network over the next ten time intervals, e.g., at times N+1, N+2, . . . , N+10. Of course, reports for two subcarriers could be transmitted at a time, using five CSI reporting intervals, or any other permutation. This reporting method minimizes the uplink bandwidth required for reporting CSI captured at one time.

In another embodiment, a persistent form of CSI reporting comprises selecting one or more subcarrier and calculating its frequency response. The quantized frequency response is then transmitted to the network. Over time, the selection of subcarriers is non-uniform. For example, a first subcarrier is selected at time N, and its quantized frequency response is transmitted to the network at reporting interval N+1. At that time, a new subcarrier (at a different frequency) is selected, and its quantized frequency response is transmitted to the network at the reporting interval N+2. Similarly, two or more subcarriers may be selected during any given CSI generation and reporting interval. This reporting method minimizes the uplink bandwidth by spreading both the subcarrier selection, and the reporting of quantized CSI data, over time.

Embodiments described herein significantly reduce CSI feedback bandwidth, while enabling highly accurate CSI availability to the network. This efficiently allows for the implementation of advanced network protocols such as joint processing in coordinated multipoint transmission, without consuming excess uplink transmission resources.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of reporting channel state information (CSI) by user equipment (UE) operative in a wireless communication network in which downlink data is modulated onto a plurality of sub-carriers, each having a different frequency, comprising, at each iteration:
   receiving a plurality of known reference symbols over a subset of the plurality of sub-carriers;
   selecting a set of non-uniformly spaced sub-carriers using a selection scheme synchronized to the network;
   estimating a frequency response for each selected sub-carrier;
   quantizing the frequency responses; and
   transmitting the quantized frequency responses to the network via an uplink control channel.

2. The method of claim 1 wherein the selected sub-carriers all include one or more reference symbols.

3. The method of claim 1 wherein one or more of the selected sub-carriers does not include any reference symbols.

4. The method of claim 1 further comprising applying Forward Error Correction coding to the quantized frequency responses prior to transmitting them.

5. The method of claim 1 wherein selecting a set of non-uniformly spaced sub-carriers comprises selecting a different set of non-uniformly spaced sub-carriers for each CSI reporting iteration.

6. The method of claim 1 wherein selecting a set of non-uniformly spaced sub-carriers using a selection scheme synchronized to the network comprises selecting the set based on pseudo-randomized indices with an index reading offset synchronized to the network.

7. The method of claim 6 wherein the pseudo-randomized indices comprise the sequential indices produced by one of an interleaver and a pseudo-random number generator.

8. The method of claim 7 wherein the interleaver or pseudo-random number generator is computed by algebraic modification of input reading indices.

9. The method of claim 8 wherein the algebraic modification is based on quadratic permutation polynomials.

10. The method of claim 8 wherein the algebraic modification is based on finite-field computation.

11. The method of claim 7 wherein the interleaver is computed based on a column-interleaved rectangular array.

12. The method of claim 11 wherein the column-interleaved rectangular array is derived according to section 5.1.4.2.1 of the 3GPP Technical Specification 36.212, "Multiplexing and channel coding."

13. The method of claim 7 wherein the sequential indices are synchronized between the UE and the network by a predetermined index offset.

14. The method of claim 13 further comprising transmitting the predetermined index offset to the network with the quantized frequency responses.

15. The method of claim 13 further comprising computing the predetermined index offset based on a unique UE identification number.

16. The method of claim 13 further comprising computing the predetermined index offset based on a sub-frame number.

17. The method of claim 13 further comprising computing the predetermined index offset based on an iteration count of CSI feedback.

18. The method of claim 13 further comprising computing the predetermined index offset based on a unique antenna identification number.

19. The method of claim 13 further comprising computing the predetermined index offset based on a unique network identification number.

20. The method of claim 13 further comprising computing the predetermined index offset based on a resource index of the uplink control channel.

21. The method of claim 20 wherein the uplink control channel resource index is an index of a first resource block for the uplink control channel.

22. The method of claim 13 further comprising computing the predetermined index offset based on a resource index of a downlink control channel.

23. The method of claim 22 wherein the downlink control channel resource index is an index of a first resource block for the downlink control channel.

24. The method of claim 13 further comprising receiving the predetermined index offset from the network.

25. The method of claim 13 wherein the predetermined index offset is programmed into the UE.

26. The method of claim 25 further comprising retrieving the predetermined index offset from a look-up table stored in memory on the UE.

27. The method of claim 1 wherein transmitting the quantized frequency responses to the network via an uplink control channel comprises transmitting less than the entire set of quantized frequency responses in one CSI iteration.

28. The method of claim 27, further comprising transmitting one or more quantized frequency responses in a following CSI iteration.

29. The method of claim 1 wherein selecting a set of non-uniformly spaced sub-carriers using a selection scheme synchronized to the network comprises selecting one or more, but less than the entire set, of sub-carriers in each CSI iteration, such that the set of sub-carriers selected over two or more CSI iterations is non-uniform.

30. The method of claim 1 wherein selecting a set of non-uniformly spaced sub-carriers using a selection scheme synchronized to the network comprises:
   selecting a set of uniformly spaced sub-carriers; and
   applying pseudo-random dithering, generated using a key synchronized to the network, to the set of uniformly spaced sub-carriers to generate the set of non-uniformly spaced sub-carriers.

31. The method of claim 30 wherein the maximum span of the pseudo-random dithering is smaller than the uniform spacing in the set of uniformly spaced sub-carriers.

32. The method of claim 30 further comprising computing the pseudo-random dithering by an algebraic modification of an input key.

33. The method of claim 30 wherein the pseudo-random dithering is obtained from the sequential indices produced by one of an interleaver and a pseudo-random number generator.

34. The method of claim 33 wherein the interleaver or pseudo-random number generator is computed by algebraic modification of input reading indices.

35. The method of claim 34 wherein the algebraic modification is based on quadratic permutation polynomials.

36. The method of claim 34 wherein the algebraic modification is based on finite-field computation.

37. The method of claim 33 wherein the interleaver is computed based on a column-interleaved rectangular array.

38. The method of claim 37 wherein the column-interleaved rectangular array is derived according to section 5.1.4.2.1 of the 3GPP Technical Specification 36.212, "Multiplexing and channel coding."

39. The method of claim 33 wherein the sequential indices are synchronized between the UE and the network by a predetermined index offset.

40. The method of claim 39 further comprising transmitting the predetermined index offset to the network with the quantized frequency responses.

41. The method of claim 39 further comprising computing the predetermined index offset based on a unique UE identification number.

42. The method of claim 39 further comprising computing the predetermined index offset based on a sub-frame number.

43. The method of claim 39 further comprising computing the predetermined index offset based on an iteration count of CSI feedback.

44. The method of claim 39 further comprising computing the predetermined index offset based on a unique antenna identification number.

45. The method of claim 39 further comprising computing the predetermined index offset based on a unique network identification number.

46. The method of claim 39 further comprising computing the predetermined index offset based on a resource index of the uplink control channel.

47. The method of claim 46 wherein the uplink control channel resource index is an index of a first resource block for the uplink control channel.

48. The method of claim 39 further comprising computing the predetermined index offset based on a resource index of a downlink control channel.

49. The method of claim 46 wherein the downlink control channel resource index is an index of a first resource block for the downlink control channel.

50. The method of claim 39 further comprising receiving the predetermined index offset from the network.

51. The method of claim 39 wherein the predetermined index offset is programmed into the UE.

52. The method of claim 51 further comprising retrieving the predetermined index offset from a look-up table stored in memory on the UE.

53. The method of claim 1 wherein selecting a set of non-uniformly spaced sub-carriers comprises receiving from the network an indication of the sub-carriers to be selected.

54. The method of claim 1 wherein quantizing the frequency responses comprises:
receiving from the network an indication of a quantizer to use; and
quantizing the frequency responses using the indicated quantizer.

55. The method of claim 54 wherein the indication of a quantizer to use specifies the number of bits used to quantize each frequency response.

56. The method of claim 1 wherein transmitting the quantized frequency responses to the network via an uplink control channel comprises:
receiving from the network an indication how often to transmit quantized frequency responses to the network; and
transmitting the quantized frequency responses to the network at the indicated rate.

57. A method of reporting channel state information (CSI) by user equipment (UE) operative in a wireless communication network in which downlink data is modulated onto a first plurality of sub-carriers, each having a different frequency, comprising, at each iteration:
receiving a plurality of known reference symbols over a subset of the first plurality of sub-carriers;
estimating a frequency response for each of a second plurality of sub-carriers;
collecting the frequency responses into a vector;
selecting a group of frequency responses by multiplying the vector of frequency responses by a mixing matrix that is synchronized to the network, to yield a vector of selected frequency responses;
quantizing the selected frequency responses; and
transmitting the quantized frequency responses to the network via an uplink control channel.

58. The method of claim 57 wherein estimating a frequency response for each of a second plurality of sub-carriers comprises estimating a whitened channel response for each of the second plurality of sub-carriers.

59. The method of claim 57 wherein the mixing matrix is changed for each iteration of CSI reporting.

60. The method of claim 59 wherein, for each iteration, a mixing matrix is selected in round-robin order from a collection of predetermined mixing matrices.

61. The method of claim 59 wherein, for each iteration, a different row composition is selected for the mixing matrix.

62. The method of claim 61 wherein the row composition is selected in round-robin order from a collection of predetermined rows.

63. The method of claim 61 wherein the row composition is selected by a pseudo-random selection from a collection of predetermined rows.

64. The method of claim 63 wherein the pseudo-random row selection is obtained from the sequential indices produced by one of an interleaver and a pseudo-random number generator.

65. The method of claim 64 wherein the interleaver or pseudo-random number generator is computed by algebraic modification of input reading indices.

66. The method of claim 65 wherein the algebraic modification is based on quadratic permutation polynomials.

67. The method of claim 65 wherein the algebraic modification is based on finite-field computation.

68. The method of claim 64 wherein the interleaver is computed based on a column-interleaved rectangular array.

69. The method of claim 68 wherein the column-interleaved rectangular array is derived according to section 5.1.4.2.1 of the 3GPP Technical Specification 36.212, "Multiplexing and channel coding."

70. The method of claim 64 wherein the sequential indices are synchronized between the UE and the network by a predetermined index offset.

71. The method of claim 70 further comprising transmitting the predetermined index offset to the network with the quantized frequency responses.

72. The method of claim 70 further comprising computing the predetermined index offset based on a unique UE identification number.

73. The method of claim 70 further comprising computing the predetermined index offset based on a sub-frame number.

74. The method of claim 70 further comprising computing the predetermined index offset based on an iteration count of CSI feedback.

75. The method of claim 70 further comprising computing the predetermined index offset based on a unique antenna identification number.

76. The method of claim 70 further comprising computing the predetermined index offset based on a unique network identification number.

77. The method of claim 70 further comprising computing the predetermined index offset based on a resource index of the uplink control channel.

78. The method of claim 77 wherein the uplink control channel resource index is an index of a first resource block for the uplink control channel.

79. The method of claim 70 further comprising computing the predetermined index offset based on a resource index of a downlink control channel.

80. The method of claim 79 wherein the downlink control channel resource index is an index of a first resource block for the downlink control channel.

81. The method of claim 70 further comprising receiving the predetermined index offset from the network.

82. The method of claim 70 wherein the predetermined index offset is programmed into the UE.

83. The method of claim 82 further comprising retreiving the predetermined index offset from a look-up table stored in memory on the UE.

84. The method of claim 57 wherein each row of the mixing matrix has at most one nonzero element.

85. The method of claim 57 wherein the mixing matrix is an orthonormal matrix.

86. The method of claim 85 wherein the orthonormal matrix is a Hadamard matrix.

87. The method of claim 57 wherein the mixing matrix is a unitary matrix.

88. The method of claim 87 wherein the mixing matrix is formed by:
generating a plurality of pseudo-random matrices with independent Gaussian-distributed entries;
performing a QR decomposition on each random matrix to generate a unitary matrix; and
selecting a unitary matrix as the mixing matrix.

89. The method of claim 57 wherein selecting a group of frequency responses by multiplying the vector of frequency responses by a mixing matrix that is synchronized to the network comprises:
receiving from the network an indication of the mixing matrix to use, and
multiplying the vector of frequency responses by the indicated mixing matrix.

* * * * *